United States Patent
Lin et al.

(10) Patent No.: US 7,474,415 B2
(45) Date of Patent: Jan. 6, 2009

(54) MEASUREMENT METHOD OF THREE-DIMENSIONAL PROFILES AND RECONSTRUCTION SYSTEM THEREOF USING SUBPIXEL LOCALIZATION WITH COLOR GRATINGS AND PICTURE-IN-PICTURE SWITCHING ON SINGLE DISPLAY

(75) Inventors: Chern-Sheng Lin, Taichung (TW); Jyh-Fa Lee, Longtan Township, Taoyuan County (TW); Mau-Shiun Yeh, Chiayi (TW); Chia-Hau Lin, Jhunan Township, Miaoli County (TW); Shih-Liang Ku, Sinpu Township, Hsinchu County (TW)

(73) Assignee: Chung Shan Institute of Science and Technology, Armaments Bureau, M.N.D., Taoyuan County (TW)

( * ) Notice: Subject to any disclaimer, the term of this patent is extended or adjusted under 35 U.S.C. 154(b) by 300 days.

(21) Appl. No.: 11/519,960

(22) Filed: Sep. 13, 2006

(65) Prior Publication Data

US 2008/0063260 A1   Mar. 13, 2008

(51) Int. Cl.
*G01B 11/24* (2006.01)
(52) U.S. Cl. ................................. 356/604
(58) Field of Classification Search ............... 356/124, 356/604, 613; 382/141, 144–145; 702/152, 702/167
See application file for complete search history.

(56) References Cited

U.S. PATENT DOCUMENTS

| | | | | |
|---|---|---|---|---|
| 4,796,997 A | * | 1/1989 | Svetkoff et al. | 356/608 |
| 5,359,369 A | * | 10/1994 | Izawa et al. | 348/672 |
| 6,100,990 A | * | 8/2000 | Ladewski | 356/445 |
| 6,208,412 B1 | * | 3/2001 | Ladewski | 356/239.1 |
| 6,549,288 B1 | * | 4/2003 | Migdal et al. | 356/603 |
| 6,853,458 B2 | * | 2/2005 | Yahashi et al. | 356/604 |
| 2002/0039187 A1 | * | 4/2002 | Keranen | 356/604 |
| 2003/0016366 A1 | * | 1/2003 | Takeda et al. | 356/604 |
| 2004/0046966 A1 | * | 3/2004 | Fujita | 356/604 |

\* cited by examiner

*Primary Examiner*—Tarifur R. Chowdhury
*Assistant Examiner*—Isiaka O Akanbi
(74) *Attorney, Agent, or Firm*—Rosenberg, Klein & Lee

(57) ABSTRACT

The present invention is a measurement method of three-dimensional profiles and a reconstruction system thereof using subpixel localization with color gratings and picture-in-picture switching on a single display, wherein the measurement method includes: 1. Preparation step; 2. Projection step; 3. Image extraction step; 4. Image fine-tuning step; 5. Image processing step; and 6. Reconstruction step. The system includes: a projection apparatus, emitting a grating towards a workpiece under measurement, and forming a grating image on the workpiece under measurement, the contrast values of the plurality of grating stripes of the grating image being identical; a central processing unit, using the grating image and picture-in-picture of a display thereof to fine tune and reconstruct three-dimensional profiles of the workpiece under measurement. Thereby, the grating stripes have equal contrast for easier identification; the display has switchable picture-in-picture; and an adjustment module can adjust the grating.

9 Claims, 9 Drawing Sheets
(2 of 9 Drawing Sheet(s) Filed in Color)

MEASUREMENT METHOD OF THREE-DIMENSIONAL PROFILES AND RECONSTRUCTION SYSTEM THEREOF USING SUBPIXEL LOCALIZATION WITH COLOR GRATINGS AND PICTURE-IN-PICTURE SWITCHING ON SINGLE DISPLAY

FIELD OF THE INVENTION

The present invention relates to a measurement method of three-dimensional profiles and a reconstruction system thereof using subpixel localization with color gratings and picture-in-picture switching on a single display. The present invention has the effects of identical contrast on gratings for easier identification, switchable picture-in-picture on the display, and adjustable gratings with an adjustment module.

BACKGROUND OF THE INVENTION

With the improvements of industry technologies and the trend of low-quantity highly diversified products, the key to taking the lead among competitors and expanding market is on shrinking manufacturing time of products, which has become an important subject in product development. Thereby, people take related reverse engineering technologies more and more seriously. Product examinations, industrial fabrications, product shape designs, object profile scans, and multimedia animation productions all count on a measurement technology with rapidity and precision. In addition, the most important thing to implement reverse engineering is measurement capability.

Traditional automatic metrology technologies can be divided into two categories: contact metrology and non-contact metrology. Non-contact metrology uses light as the measurement tool and is applied extensively. In general, a grey-scale grating is projected to a workpiece under measurement for grating projection measuring method. However, because of disturbance from background light and shadow, the workpiece under measurement is inconspicuous, and consequently the stripes will be judged erroneously. If the surface of the workpiece under measurement is too glossy, one part of the surface of the workpiece under measurement will reflect strongly to make other stripes look unclear or break. Furthermore, if abruptly ascending or descending curves exist on the workpiece under measurement, shadows are easy to result and will be judged erroneously as stripes. In such a circumstance, stripe crossing happens.

In addition, traditional automatic metrology technologies still have the following drawbacks of:
1. Difficulty in identification with single-color gratings. Referring to FIG. 7, in traditional monochromatic stripes emitted on the workpiece under measurement, if the surface of the workpiece under measurement is clear, the moire method of phase-shift scanning can reconstruct three-dimensional model of the workpiece under measurement completely using high-speed, high-resolution photographic apparatus to extract grating images. However, as shown in FIG. 11 and FIG. 12, when the grating is projected on rough surface of the workpiece under measurement, the grating stripes twist and deform. If part of the stripes is covered by the shadows of the object, it is difficult to judge the correspondence of stripes, and consequently will affect reconstruction of images.
2. Unavailability of switchable picture-in-picture on displays. In tradition optical metrology, the grating of the projection apparatus and the extracted grating image by the photographic apparatus are displayed by two displays and thereby cannot be displayed on a single frame, which causes numerous equipments, complex controls, and difficult inspection. Besides, viewing images and adjusting focus of the photographic apparatus are two separate actions. It is not possible to adjust the photographic apparatus directly form the display when viewing images, causing great inconveniences.
3. Being unable to adjust gratings. Most of the gratings in the prior art are designed fixed. The stripe density and contrast cannot be adjusted. Thereby, accuracy will be lost for measurement on a small workpiece.

Accordingly, it is necessary to develop a new technology for solving the drawbacks described above.

SUMMARY

The purpose of the present invention is to provide a measurement method of three-dimensional profiles and a reconstruction system thereof using subpixel localization with color gratings and picture-in-picture switching on a single display. The gratings according to the present invention have identical contrast for easier identification.

Another purpose of the present invention is to provide a measurement method of three-dimensional profiles and a reconstruction system thereof using subpixel localization with color gratings and picture-in-picture switching on a single display. The display according to the present invention has switchable picture-in-picture.

Still another purpose of the present invention is to provide a measurement method of three-dimensional profiles and a reconstruction system thereof using subpixel localization with color gratings and picture-in-picture switching on a single display. The present invention has an adjustment module for adjusting gratings.

The present invention provides a measurement method of three-dimensional profiles and a reconstruction system thereof using subpixel localization with color gratings and picture-in-picture switching on a single display, wherein the measurement method includes:
1. Preparation step;
2. Projection step;
3. Image extraction step;
4. Image fine-tuning step;
5. Image processing step; and
6. Reconstruction step.

The reconstruction system thereof includes:
a projection apparatus, used for emitting grating light towards a workpiece under measurement, the grating light having a plurality of grating stripes with identical contrast, and the grating light forming a grating image of stripes comprising a plurality of colors on the workpiece under measurement;
a photographic apparatus, used for extracting the grating image from the workpiece under measurement;
a central processing unit, comprising at least:
a central processor, used for performing image analysis on the grating image, eliminating noises, and thinning the stripes, using parabolic curve distribution analysis for giving the minimum and the maximum of the grey-scale distribution with more accuracy, each pixel in the grating image with thinned stripes being given, thinned stripes being used for approximation with parabolic curve distributions to give the maximum curvature of the stripes, and the three-dimensional profiles of the workpiece under measurement being given with phase-shift technology and phase reconstruction.

a display, coupling to the central processor electrically, and the display comprising at least two switching modes of:

a. displaying a first displaying part and a second displaying part simultaneously: capable of displaying the grating which the projection apparatus projects or the grating image extracted by the photographic apparatus, the first displaying part at least being able to adjust directly the focus, aperture, and depth of field of the photographic apparatus; and b. displaying the grating image or the three-dimensional profiles using the second displaying part with full screen.

In order to make the structure and characteristics as well as the effectiveness of the present invention to be further understood and recognized, the detailed description of the present invention is provided as follows along with preferred embodiments and accompanying figures.

BRIEF DESCRIPTION OF THE DRAWINGS

The file of this Patent contains at least one Drawing Figure executed in color. Copies of the Patent with color Drawings will be provided by the Patent and Trademark Office upon request and payment of the necessary fee.

DETAILED DESCRIPTION

Figure 1:
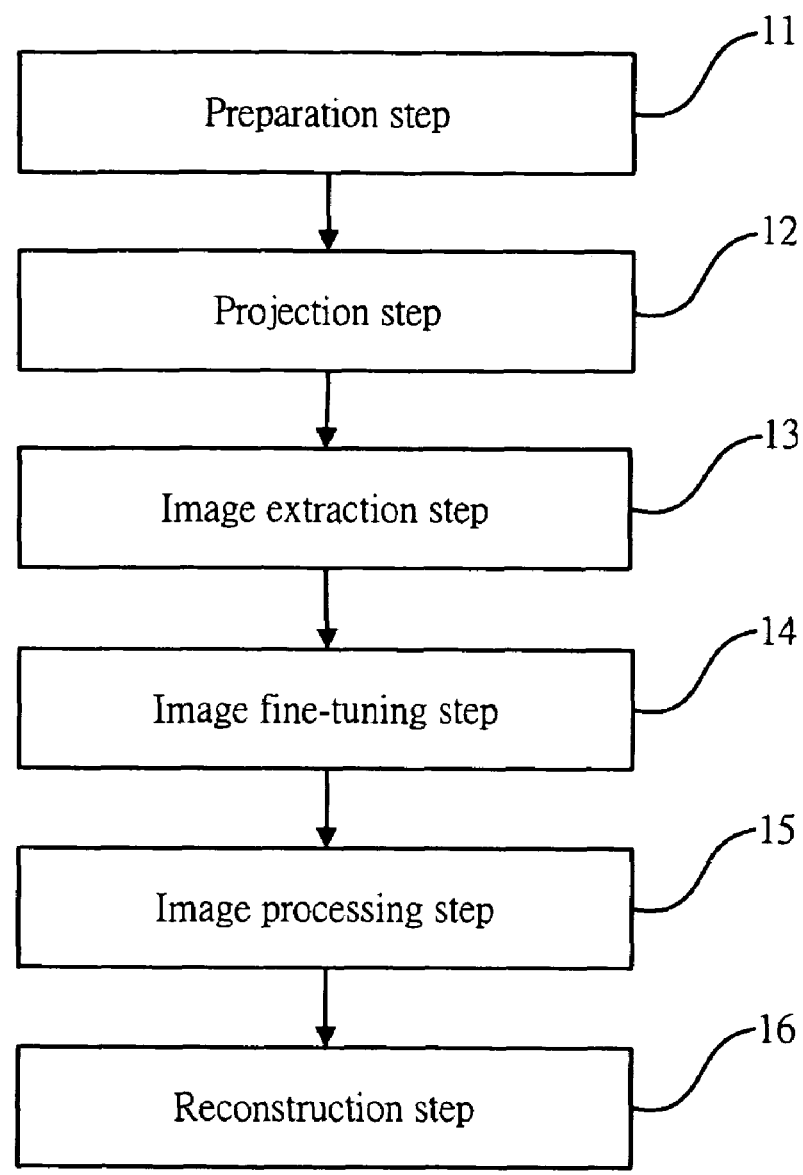
FIG. 1 is a flowchart of the measurement method of three-dimensional profiles according to a preferred embodiment of the present invention.
Figure 2:
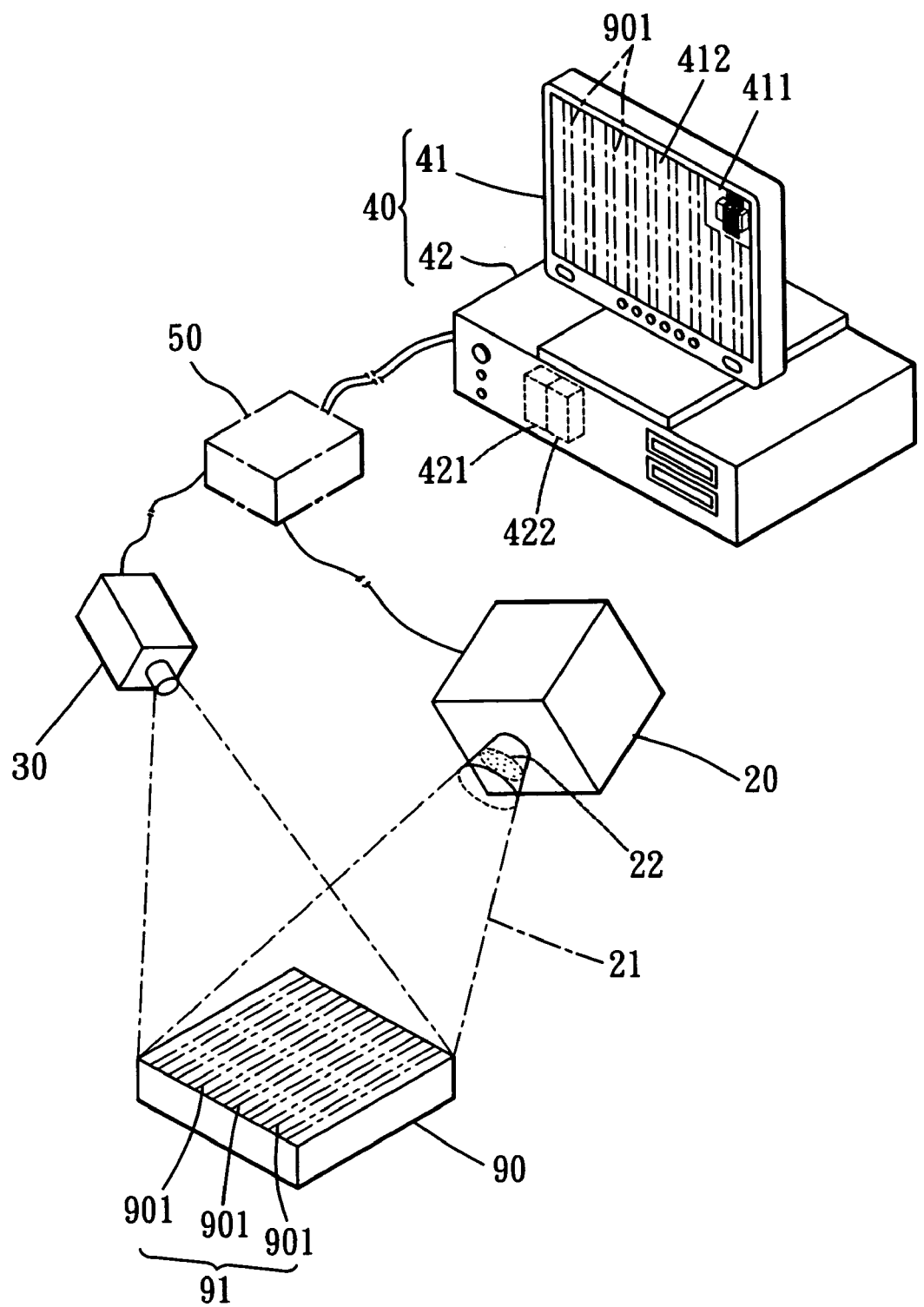
FIG. 2 is a fundamental framework of the reconstruction system of three-dimensional profiles according to a preferred embodiment of the present invention.

Please refer to FIG. 1 and FIG. 2. The present invention is a measurement method of three-dimensional profiles and a reconstruction system thereof using subpixel localization with color gratings and picture-in-picture switching on a single display, wherein the measurement method includes the following steps of:

1. Preparation step 11: preparing a projection apparatus 20, a photographic apparatus 30, and a central processing unit 40;

2. Projection step 12: starting the projection apparatus 20, which emits grating light 21 towards a workpiece under measurement 90, the grating light 21 having a plurality of grating stripes with identical contrast and forming a grating image 91 on the workpiece under measurement 90, and the grating image 91 being comprised of a plurality of stripes 901 with identical contrast (refer to FIG. 3 and FIG. 4);

3. Image extraction step 13: starting the photographic apparatus 30, and extracting the grating image 91 from the workpiece under measurement 90;

4. Image fine-tuning step 14: the central processing unit 40 having a display 41, which can display a first displaying part 411 (that is, the sub-picture) and a second displaying part 412 (that is, the main picture) simultaneously, the second displaying part 412 displaying the grating to be projected by the projection apparatus, the first displaying part 411 displaying the extracted grating image 91, which can be used for adjusting the focus, aperture, and depth of field of the photographic apparatus 30, the first displaying part 411 being shut down from the display 41 and the display 41 being switched to display the grating image 91 using the second displaying part 412 with full screen after the grating image 91 is shown distinctly on the first displaying part 411;

5. Image processing step 15: the central processing unit 40 receiving the grating image 91 from the photographic apparatus 30, performing image analysis on the grating image 91, eliminating unnecessary background noises, and then thinning the stripes of the grating image 91; and 6. Reconstruction step 16: using phase-shift technology and phase reconstruction on each pixel in the grating image 91 with thinned stripes to give the three-dimensional profiles of the workpiece under measurement 90.

The practical operation method of the present invention uses the central processor 42 of the central processing unit 40 to prepare in advance the grating (that is, the grating light 21) to be projected. The contrast of stripes (for example, stripes in FIG. 5) of the grating is identical to each other, and the grating density is preferably 5 stripes/mm. The grating is preferably colored (as shown in FIG. 13C), and the color combinations can be variations such as R, G, B, ½R, ½G, ½B, ⅓R, ⅓G, ⅓B, ¼R, ¼G, ¼B, (½R+½G), (½R+½B), (½G+½B), (⅓R+⅓G), (⅓R+⅓B), (⅓G+⅓B), where R, G, B represent the three primary colors. The method for generating color-grating stripes can be:

$I = [LPM \times 1.6, LPM \times 3]$ if $I_{min} \times 3 < 255$, then $R = \text{Random}\,[0, I_{min} \times 3]$, $R \in [0, 255]$ else $R = \text{Random}\,[0, 255]$, $R \in [0, 255]$ $G = 3 \times I - R - \text{Random}\,[0, 255]$, $G \in [0, 255]$ $B = 3 \times I - R - G$, $B \in [0, 255]$ where I is the total luminance of the grating, and LPM (Line pair/mm) is the number of grating. By limiting the value of I between [LPM×1.6, LPM×3], the values of G and B can be prevented from over-saturation to cause non-uniformity in grating luminance. The value of R is generated by a random number. If the total luminance of the grating (I) is too low, limit the value of R between [0, $I_{min}×3$], so that the values of R, G, and B can be prevented from over-saturation, and thereby they can be located between [0, 255]. The value of G is also generated by a random number, and the range thereof is limited between [0, 255] as well.

The generation method of the color grating stripes can follow the rule of maximum color luminance values of each color grating stripe being equal, where the maximum color luminance value Bn is defined as:

$Bn≡Max(R,G,B), Bn∈[0,255]$

In order to make maximum color luminance values of each color grating stripe to be equal, it is necessary to make the Bn values of each grating stripe equal. The generation method of color grating stripes is to select a value of R randomly, and limit the maximum value thereof to be Bn:

$R=Random [0,255]$ if R≧Bn, R=Bn

Select a value of G randomly, and limit the maximum value thereof to be Bn:

$G=Random [0,255]$ if G≧Bn, G=Bn

Take the maximum value of R and G. If the maximum value is Bn, then the value of B can be random; if not, then the value of B is set to be Bn:

if (Max$(R, G)$=Bn), B=Random [0, $Bn$]

else B=Bn

Please refer to FIG. 2. Output the grating prepared in advance by the central processor 42 to the projection apparatus 20 (for example, a Digital Light Processor, abbreviated as DLP). By way of the projection apparatus 20, project the grating to the workpiece under measurement 90 to form the grating image 91. Then, extract the grating image 91 and transmit back to the central processing unit 40, and display on the display 41 of the central processing unit 40.

Use the first displaying part 411 of the display 41 (for example, a camera with a charge-coupled device, abbreviated as CCD) to display the extracted grating image 91. In addition, the first displaying part 411 is used for adjusting the photographic apparatus 30. The first displaying part 411 is shut down from the display 41 and the display 41 is switched to display the grating image 91 using the second displaying part 412 with full screen after the grating image 91 is shown distinctly on the first displaying part 411.

Use the central processor 42 to give the stripes 901 with different series numbers on the grating image 91 different RGB color combinations. Then read the locations of the stripes 901 of the color grating image 91, and reconstruct three-dimensional profiles of the workpiece under measurement 90 correctly.

Figure 6:
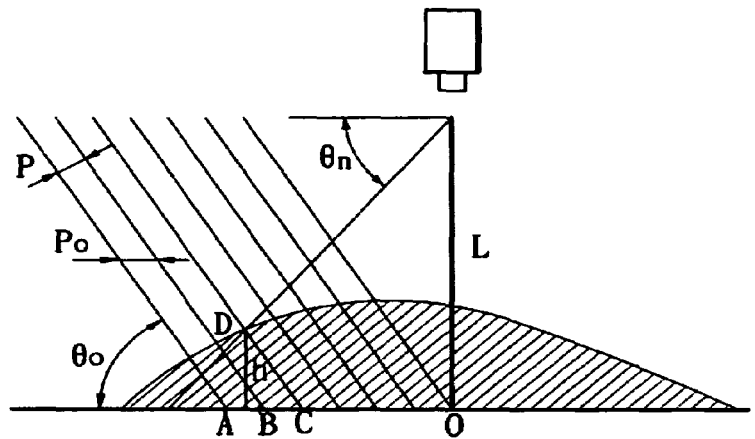
FIG. 6 is a schematic diagram of grating image stripes according to a preferred embodiment of the present invention.
Figure 7:
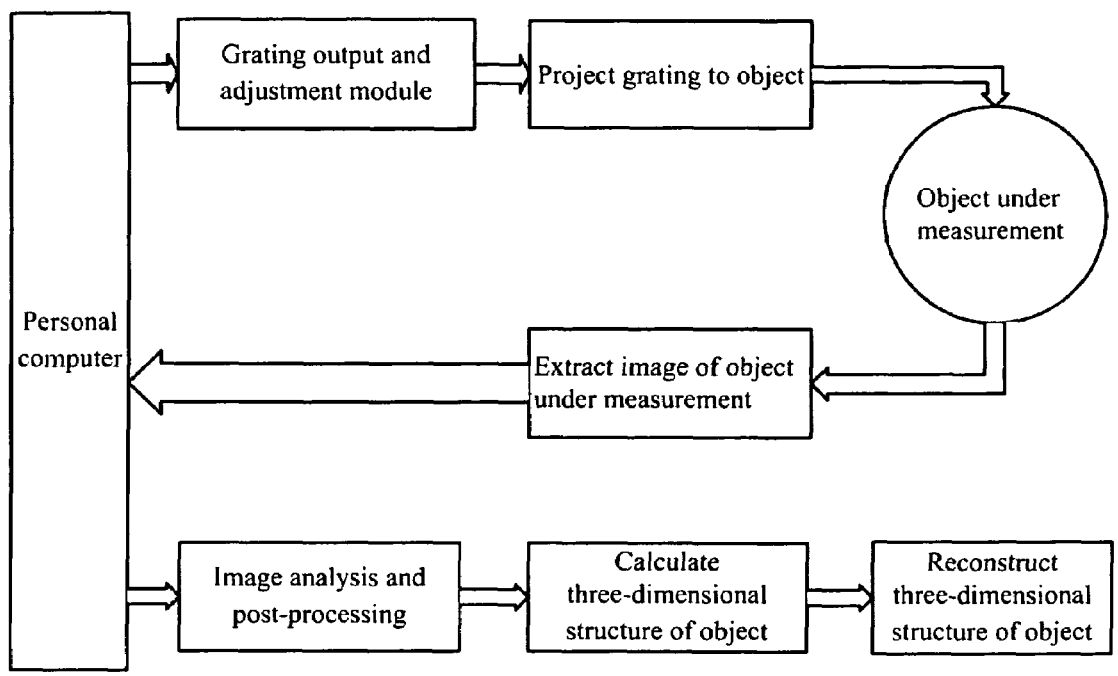
FIG. 7 is a practical flowchart according to a preferred embodiment of the present invention.

Please refer to FIG. 6 for example. When grating light forms grating image on the workpiece under measurement, if there exists a reference plane, then the height of the workpiece under measurement relative to the reference plane can be expressed as:

$$h(x, y) = \frac{P_0 \cdot \tan\theta_0 \cdot \phi_{CD}}{2\pi(1 + \tan\theta_0/\tan\theta_n)} \tag{1}$$

where $P_0$ is the pitch of the grating light to projected onto the reference plane; $\theta_0$ is the projection angle; $\theta_n$ is the angle between D-point extracted by the photographic apparatus and the reference plane; and $\psi_{CD}$ is the phase value of D-point relative to C-point. Assuming $\theta_n$=90°, then the surface height can be expressed by:

$$h(x, y) = \left(\frac{P_0 \cdot \tan\theta_0}{2\pi}\right)\phi_{CD} \tag{2}$$

Because $P_0$ and $\theta_0$ are both fixed values and the reference plane can be assumed at any location, the profiles of the workpiece under measurement can be determined by the phase distribution of the deformed stripes projected on the workpiece under measurement.

The relation between light intensity and phase shift of a digital grating with sinusoidal intensity distribution can be expressed as:

$$I(x,y)=I'(x,y)+I''(x,y)\cos[\phi(x,y)+\delta] \tag{3}$$

Because there are three unknowns, which are I'(x,y) (average intensity), I''(x, y) (intensity modulation), and δ (phase modulation), at least three different equations are needed to give their values. Use the photographic apparatus to take four grating images with 90-degree phase shift, the relation between phase value and light intensity can be given as:

$$\phi(x, y)=\tan^{-1}((I_4 I_2)/(I_1-I_3)) \tag{4}$$

By using the above equation, phase-shift technology, and phase reconstruction, the three-dimensional profiles of the workpiece under measurement are given.

Figure 8:
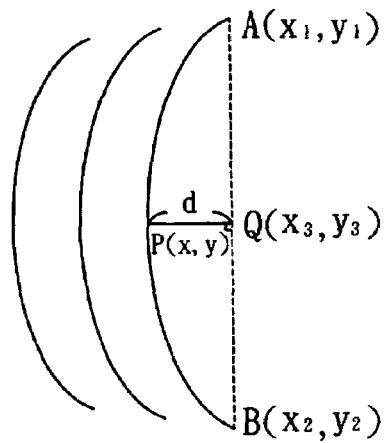
FIG. 8 is a schematic diagram of line-segment projection method according to a preferred embodiment of the present invention.

Furthermore, according to the present invention, line-segment projection method can be applied to measure surface height of the workpiece under measurement 90. The method uses displacements of grating stripes on the surface of the workpiece under measurement 90 to calculate the height thereof (as shown in FIG. 8). The method is described as follows.

The two end points on the predetermined thinned stripes of the workpiece under measurement 90 are A($x_1,y_1$) and B($x_2, y_2$), and the slope $m_1$ thereof is:

$$m_1 = \frac{y_2 - y_1}{x_2 - x_1}$$

To calculate object height d on each point of the line segment, make a perpendicular line from the arbitrary point P(x,y) on the line segment to line AB. Then, the line segment PQ is the desired object height, and the slope thereof is:

$$m_2 = -\frac{1}{m_1}$$

By using the simultaneous equations of line AB and line PQ, the cross point of the two lines Q($x_3,y_3$) is:

$$\begin{cases} y = m_1 x + c_1 \\ y = m_2 x + c_2 \end{cases}$$

-continued $$\begin{cases} x_3 = \dfrac{c_2 - c_1}{m_1 - m_2} \\ y_3 = m_1 \cdot \dfrac{c_2 - c_1}{m_1 - m_2} + c_1 \end{cases}$$

By calculating the distance between the points P and Q, the object height d is given as:

$$d = \overline{PQ} = \sqrt{(x_3-x)^2 + (y_3-y)^2}$$

In digital image processing, if the grey scales and colors of pixels of a workpiece under measurement, as well as information of adjacent pixels of the workpiece under measurement can be considered altogether, measurement accuracy can be enhanced to subpixel level.

Thereby, in the reconstruction step 16, the analysis method of parabolic curve distribution can be used to enhance measurement accuracy to subpixel level.

Figure 9:
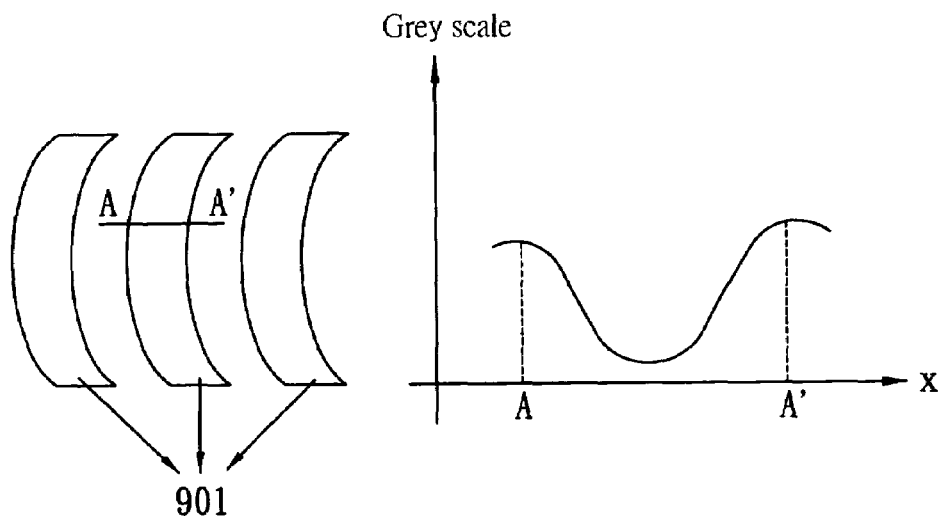
FIG. 9 is a grey-scale distribution diagram along the section AA' of a predetermined stripe in the original image according to a preferred embodiment of the present invention.
Figure 10:
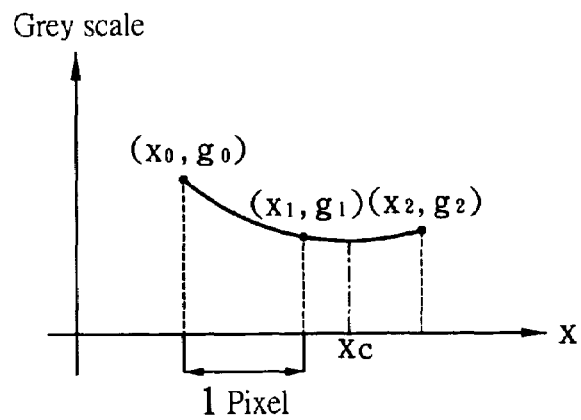
FIG. 10 is a schematic diagram of parabolic curve distribution analysis according to a preferred embodiment of the present invention.
Figure 11:
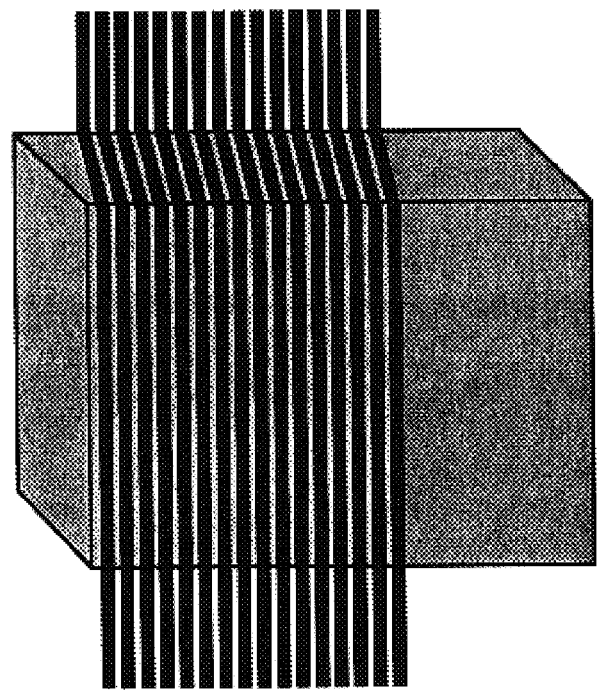
FIG. 11 is a schematic diagram of grating light projecting on the workpiece under measurement according to the prior art.
Figure 12:
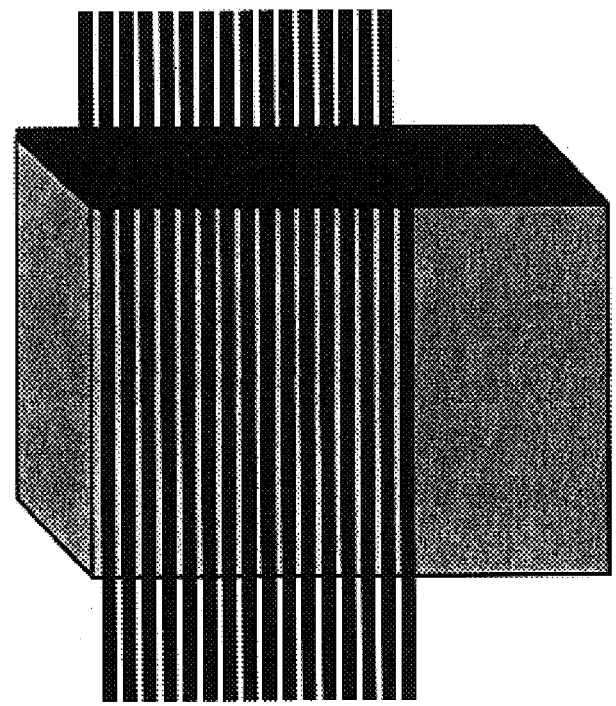
FIG. 12 is another schematic diagram of grating light projecting on the workpiece under measurement according to the prior art.

FIG. 9 is a grey-scale distribution diagram along the section AA' of a predetermined stripe in the original digital image according to a preferred embodiment of the present invention. In the left of the figure, stripes in the original digital image are displayed; in the right of the figure, a cross-section along the section AA' of a predetermined stripe in the original digital image is displayed. FIG. 10 is a schematic diagram of parabolic curve distribution analysis according to a preferred embodiment of the present invention. Assume that the parabolic equation is $g=a(x-c)^2+b$, and $(x_1,g_1)$ is the maximum or the minimum of a grey-scale distribution of a line segment in an original digital image. In addition, there are three unknowns in the parabolic equation, hence three equations are needed to solve it. Consequently, the adjacent two points of $(x_1,g_1)$, namely, $(x_0,g_0)$ and $(x_2,g_2)$, are taken for analysis of parabolic curve distribution in order to acquire locations of maximum or minimum grey-scale distribution with more accuracy. The associated mathematical equations are shown as follows.

Assume that the parabolic equation of a grey-scale distribution function of a line segment in an original digital image is:

$$g = a(x-c)^2 + b$$

Take the adjacent two points of $(x_1,g_1)$, namely, $(x_0,g_0)$ and $(x_2,g_2)$, for analysis of parabolic curve distribution:

$$\begin{cases} a(x_0 - c)^2 + b = g_0 \\ a(x_1 - c)^2 + b = g_1 \\ a(x_2 - c)^2 + b = g_2 \end{cases}$$

The three unknowns of the parabolic equation are given as:

$$c = \frac{x_0^2(g_2 - g_1) + x_1^2(g_0 - g_2) + x_2^2(g_1 - g_0)}{2[x_0(g_2 - g_1) + x_1(g_0 - g_2) + x_2(g_1 - g_0)]}$$

$$a = \frac{g_0 - g_2}{(x_0 - c)^2 - (x_1 - c)^2}$$

$$b = g_1 - \frac{(g_0 - g_1)(x_1 - c)^2}{(x_0 - c)^2 - (x_1 - c)^2}$$

The extreme point of the parabolic curve is (c,b). That is, $x_c=c$ is the minimum or maximum location of the grey-scale distribution of a line segment in the image approximated using the subpixel method.

Figure 3:
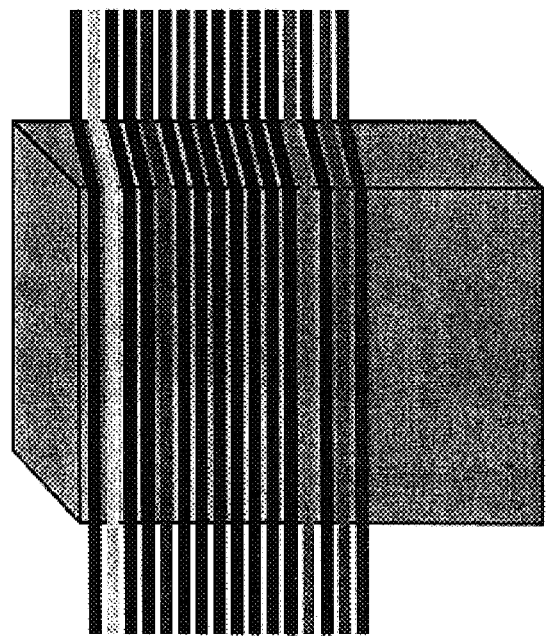
FIG. 3 is a schematic diagram of grating light projecting on the workpiece under measurement according to a preferred embodiment of the present invention.
Figure 4:
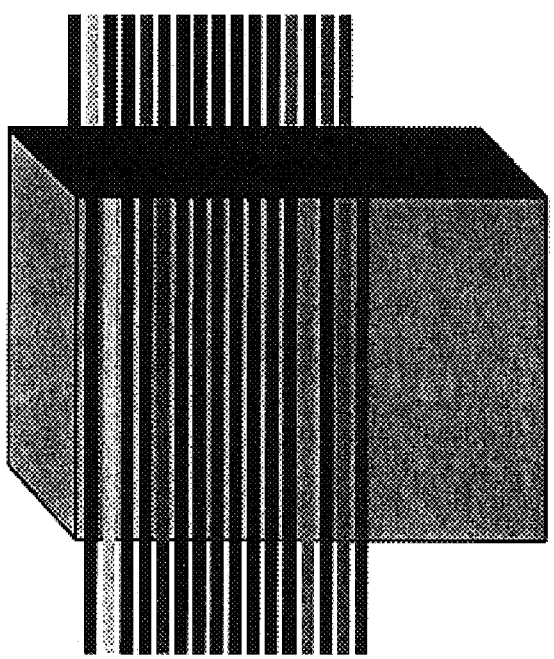
FIG. 4 is another schematic diagram of grating light projecting on the workpiece under measurement according to a preferred embodiment of the present invention.
Figure 5:
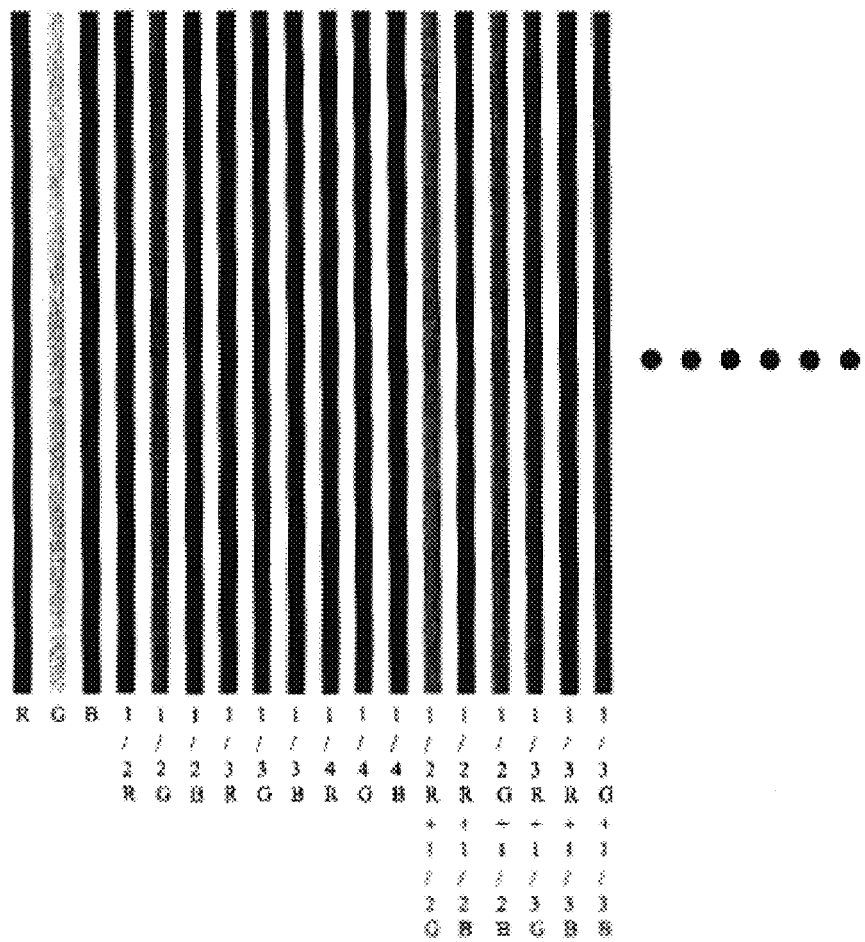
FIG. 5 is a schematic diagram of a grating according to a preferred embodiment of the present invention.
Figure 13A:
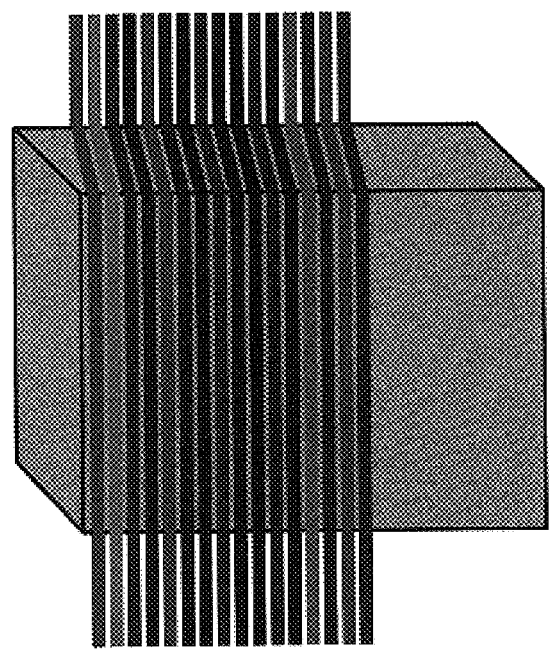
FIG. 13A is a color schematic diagram of FIG. 3.
Figure 13B:
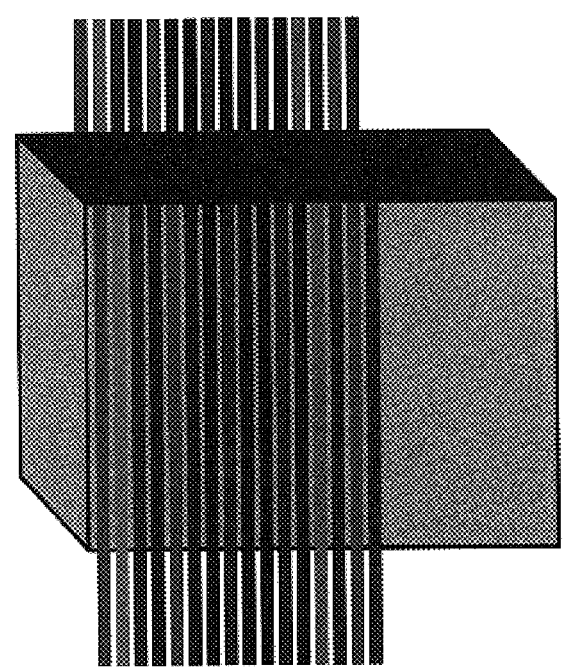
FIG. 13B is a color schematic diagram of FIG. 4.
Figure 13C:
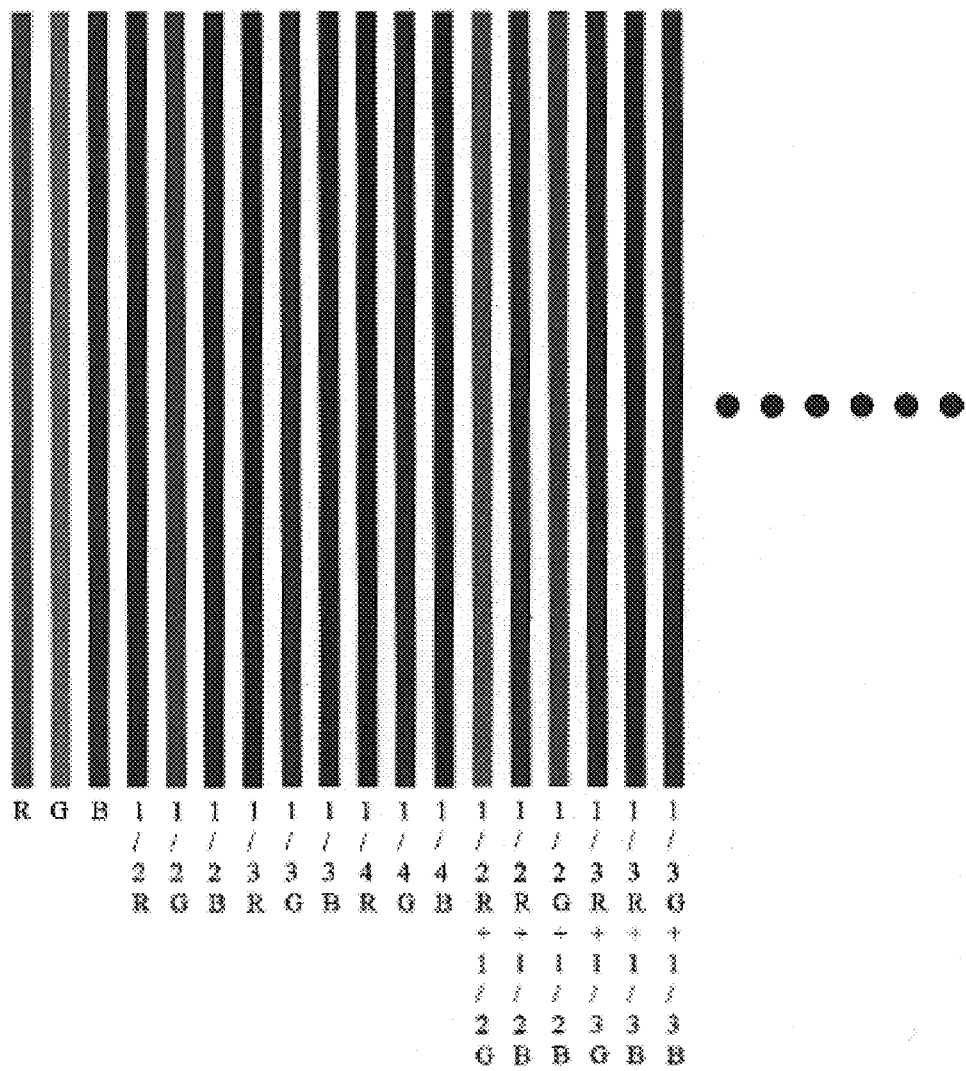
FIG. 13C is a color schematic diagram of FIG. 5.

Because the grating light 21 (as shown in FIG. 5) emitted by the projection apparatus 20 according to the present invention towards the workpiece under measurement 90 is colored (as shown in FIG. 13C), the grating image 91 (as shown in FIG. 3) formed on the workpiece under measurement 90 is colored (as shown in FIG. 13A) accordingly. The contrast values of the stripes 901 are equal. Even if part of the grating image 91 on the workpiece under measurement 90 is covered by the shadow of the workpiece under measurement 90 (as shown in FIG. 4, the corresponding color diagram is shown in FIG. 13B), the junction of each stripe still can be clearly identified. Thereby, the three-dimensional profiles of the workpiece under measurement can be truly reconstructed.

The measurement method of three-dimensional profiles according to the present invention can be applied to:
1. Optics: measuring shapes and curvature of products;
2. Optical communication: measuring end faces of optical fibers;
3. Semiconductor: measuring surface profiles of wafers;
4. Electronics: measuring thickness of soldering paste; and
5. Mechanics: measuring external shapes and surface roughness of mechanical bodies.

Please refer to FIG. 2, which is the reconstruction system according to the present invention, comprising:
a projection apparatus 20, used for emitting grating light 21 towards a workpiece under measurement 90, the grating light 21 having a plurality of grating stripes 910 with identical contrast, and the grating light 21 forming a grating image 91 of stripes comprising a plurality of colors on the workpiece under measurement 90;
a photographic apparatus 30, used for extracting the grating image 91 from the workpiece under measurement 90;
a central processing unit 40, comprising at least a display 41 and a central processor 42, wherein
the display 41, used for displaying a first displaying part 411 and a second displaying part 412 simultaneously, the first displaying part 411 (the sub-picture) being used for displaying extracted grating image 91, and adjusting the focus, aperture, and depth of field of the photographic apparatus 30, the first displaying part 411 being shut down from the display 41 and the display 41 being switched to display the grating image 91 (can also be the stripes 901) using the second displaying part 412 with full screen after the grating image 91 (can also be the stripes 901) is shown distinctly on the first displaying part 411; and
the central processor 42, used for performing image analysis on the grating image 91, eliminating unnecessary background noises, and thinning the stripes on the grating image 91, three-dimensional profiles of the workpiece under measurement being given with the thinned stripes, phase-shift technology and phase reconstruction, and the three-dimensional profiles of the workpiece under measurement being displayed on the display 41.

Thereby, the reconstruction system of three-dimensional profiles using color gratings and picture-in-picture switching on a single display is described.

In FIG. 2, in practice, the projection apparatus 20 is a Digital Light Processor (DLP), which has the advantages of high luminance, correct color-tone reproducibility, high response time, and no noises. In addition, the grating light 21 emitted by it is pre-processed into colors by the central processor 42 (as shown in FIG. 5; the corresponding color diagram is shown in FIG. 13C). Thereby, the grating image 91 formed on the workpiece under measurement 90 is colored. The lens of the projection apparatus 20 can further include a focusing lens 22, which controls the projection apparatus 20 to output the grating light 21 with various sizes according to different sizes of the workpiece under measurement 90.

The photographic apparatus 30 is a camera with a charge-coupled device (CCD), preferably being a color camera.

The reconstruction system of three-dimensional profiles using color gratings and picture-in-picture switching on a single display further includes:

a generation module for color grating series numbers 421, used for giving stripes 901 with different series numbers on the grating image 91 different RGB color combinations;

a read module for color grating series numbers 422, used for reading locations of color stripes 901 correctly, and reconstructing correct three-dimensional profiles of the workpiece under measurement 90, the generation module for color grating series numbers 421 and the read module for color grating series numbers 422 being adapted in the central processor 42 directly; and an adjustment module 50, used for producing and adjusting density and contrast of grating stripes of gratings to be projected (namely, grating light 21), the adjustment module 50 being adapted in the central processor 42 directly, or being replaced by the central processor 42.

The advantages and effects of the present invention are summarized as follows:

1. The gratings have identical contrast for easier identification. The projected grating light according to the present invention has identical contrast (for example, using color). When it is projected on the workpiece under measurement, even if the surfaces thereof are rough to make the grating image bend, or shadows exist on the workpiece under measurement, locations of stripes of color grating can be read correctly by means of a color photographic apparatus, and three-dimensional image can be reconstructed with precision.

2. The display has a switchable picture-in-picture. The display according to the present invention has a switchable picture-in-picture featuring at least two functions:
    a. The grating to be projected by the projection apparatus can be displayed. The grating image extracted by the photography apparatus can be displayed as well; and
    b. The focus, aperture, and depth of field can be adjusted directly and easily from the first displaying part (that is, the sub-picture), so that the photographic apparatus can extract clear grating image. After adjusting the photographic apparatus, the first displaying part can be shutdown, and the reconstruction process of three-dimensional profiles can be shown clearly using the second displaying part (namely, the main picture) with full screen.

3. An adjustment module is adapted to adjust grating light. An adjustment module is adapted for producing and adjusting density and contrast of grating stripes of gratings to be projected (namely, grating light) in order to suit various workpiece under measurement.

Accordingly, the present invention conforms to the legal requirements owing to its novelty, unobviousness, and utility. However, the foregoing description is only a preferred embodiment of the present invention, not used to limit the scope and range of the present invention. Those equivalent changes or modifications made according to the shape, structure, feature, or spirit described in the claims of the present invention are included in the appended claims of the present invention.

The invention claimed is:

1. A measurement method of three-dimensional profiles using subpixel localization with color gratings and picture-in-picture switching on a single display, comprising the steps of:

preparation step, preparing a projection apparatus, a photographic apparatus, and a central processing unit;

projection step, starting the projection apparatus, which emits grating light towards a workpiece under measurement, the grating light having a plurality of grating stripes with identical contrast and forming a grating image on the workpiece under measurement and the grating image being comprised of a plurality of stripes with identical contrast;

image extraction step, starting the photographic apparatus, and extracting the grating image from the workpiece under measurement;

image fine-tuning step, the central processing unit having a display, which can display a first displaying part and a second displaying part simultaneously, the first displaying part being used for adjusting directly the focus, aperture, and depth of field of the photographic apparatus, the first displaying part being shut down from the display and the display being switched to display the grating image using the second displaying part with full screen after the grating image is shown distinctly on the first displaying part;

image processing step, the central processing unit performing image analysis on the grating image, eliminating noises, and thinning the stripes; and reconstruction step, the central processor using parabolic curve distribution analysis for giving the minimum and the maximum of the grey-scale distribution with more accuracy, each pixel in the grating image with thinned stripes being given, thinned stripes being used for approximation with parabolic curve distributions to give the maximum curvature of the stripes, and the three-dimensional profiles of the workpiece under measurement being given with phase-shift technology and phase reconstruction.

2. The measurement method of three-dimensional profiles using subpixel localization with color gratings and picture-in-picture switching on a single display of claim 1, wherein in the reconstruction step, giving stripes with different series numbers on the grating image different RGB color combinations and reading locations of the stripes correctly can reconstruct three-dimensional profiles of the workpiece under measurement.

3. The measurement method of three-dimensional profiles using subpixel localization with color gratings and picture-in-picture switching on a single display of claim 1, wherein the central processing unit at least includes a central processor, which connects electrically to the display, and prepares in advance a grating for the projection apparatus to project the grating light.

4. The measurement method of three-dimensional profiles using subpixel localization with color gratings and picture-in-picture switching on a single display of claim 3, wherein the grating light is colored, and the color combinations include at least: R, G, B, $\frac{1}{2}$R, $\frac{1}{2}$G, $\frac{1}{2}$B, $\frac{1}{3}$R, $\frac{1}{3}$G, $\frac{1}{3}$B, $\frac{1}{4}$R, $\frac{1}{4}$G, $\frac{1}{4}$B, ($\frac{1}{2}$R+$\frac{1}{2}$G), ($\frac{1}{2}$R+$\frac{1}{2}$B), ($\frac{1}{2}$G+$\frac{1}{2}$B), ($\frac{1}{3}$R+$\frac{1}{3}$G), ($\frac{1}{3}$R+$\frac{1}{3}$B), ($\frac{1}{3}$G+$\frac{1}{3}$B), where R, G, B represent the three primary colors, assuming I being the total luminance of the grating, the method for generating color-grating stripes being:

$$I=[LPM \times 1.6, LPM \times 3]$$

if $I_{min} \times 3 < 255$, then $R$=Random $[0, I_{min} \times 3]$, $R \epsilon [0, 255]$ else $R$=Random $[0, 255]$, $R \epsilon [0, 255]$ $G=3 \times I-R$-Random $[0, 255]$, $G \epsilon [0, 255]$ $B=3 \times I-R-G$, $B \epsilon [0, 255]$.

5. The measurement method of three-dimensional profiles using subpixel localization with color gratings and picture-in-picture switching on a single display of claim 3, wherein the grating light is colored, and the generation method of the color grating stripes is:

defining the maximum color luminance value Bn as:

$$Bn = \text{Max}(R,G,B), Bn \epsilon [0,255]$$

selecting a value of R randomly, and limiting the maximum value thereof to be Bn:

$$R=\text{Random } [0,255]$$

if $R \geq Bn$, $R=Bn$ selecting a value of G randomly, and limiting the maximum value thereof to be Bn:

$$G=\text{Random } [0,255]$$

if $G \geq Bn$, $G=Bn$ taking the maximum value of R and G; if the maximum value being Bn, then the value of B being random; if not, then the value of B being set to be Bn:

if$(\text{Max}(R,G)=Bn)$, $B=$Random $[0, Bn]$ else $B=Bn$.

6. A reconstruction system of three-dimensional profiles using subpixel localization with color gratings and picture-in-picture switching on a single display, comprising:

a projection apparatus, used for emitting grating light towards a workpiece under measurement, the grating light having a plurality of grating stripes with identical contrast, and the grating light forming a grating image of stripes comprising a plurality of colors on the workpiece under measurement;

a photographic apparatus, used for extracting the grating image from the workpiece under measurement;

a central processing unit, comprising at least:

a central processor, used for performing image analysis on the grating image, eliminating noises, and thinning the stripes, using parabolic curve distribution analysis for giving the minimum and the maximum of the grey-scale distribution with more accuracy, each pixel in the grating image with thinned stripes being given, thinned stripes being used for approximation with parabolic curve distributions to give the maximum curvature of the stripes, and the three-dimensional profiles of the workpiece under measurement being given with phase-shift technology and phase reconstruction.

a display, coupling to the central processor electrically, and the display comprising at least two switching modes of:
  a. displaying a first displaying part and a second displaying part simultaneously: capable of displaying the grating which the projection apparatus projects or the grating image extracted by the photographic apparatus, the first displaying part at least being able to adjust directly the focus, aperture, and depth of field of the photographic apparatus; and
  b. displaying the grating image or the three-dimensional profiles using the second displaying part with full screen.

7. The reconstruction system of three-dimensional profiles using color gratings and picture-in-picture switching on a single display of claim 6, wherein:

the projection apparatus is a digital light processor; and
the photographic apparatus is a color camera with a charge-coupled device.

8. The reconstruction system of three-dimensional profiles using color gratings and picture-in-picture switching on a single display of claim 6, and further comprising:

a generation module for color grating series numbers, used for producing different RGB color combinations for stripes of the grating image with various series numbers;

a read module for color grating series numbers, used for reading locations of color stripes correctly, and reconstructing correct three-dimensional profiles of the workpiece under measurement;

an adjustment module, used for producing and adjusting density and contrast of grating stripes of gratings to be projected for the projection apparatus projecting the grating light.

9. The reconstruction system of three-dimensional profiles using color gratings and picture-in-picture switching on a single display of claim 6, wherein the lens of the projection apparatus can further include a focusing lens, which controls the projection apparatus to output the grating light with various sizes according to different sizes of the workpiece under measurement.

* * * * *